(12) United States Patent
Taylor

(10) Patent No.: US 8,756,953 B2
(45) Date of Patent: Jun. 24, 2014

(54) DEVICE FOR THE COOLING OF ARTICLES AND ITS USE

(75) Inventor: Robert Taylor, Wavre (BE)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 1032 days.

(21) Appl. No.: 12/599,230

(22) PCT Filed: May 5, 2008

(86) PCT No.: PCT/EP2008/055460
§ 371 (c)(1),
(2), (4) Date: Nov. 6, 2009

(87) PCT Pub. No.: WO2008/138792
PCT Pub. Date: Nov. 20, 2008

(65) Prior Publication Data
US 2010/0307183 A1 Dec. 9, 2010

(30) Foreign Application Priority Data

May 11, 2007 (DE) .......................... 10 2007 022 114

(51) Int. Cl.
| | | |
|---|---|---|
| *F25D 17/02* | (2006.01) | |
| *F25D 3/00* | (2006.01) | |
| *F25D 25/00* | (2006.01) | |
| *F25D 19/00* | (2006.01) | |
| *F25B 39/02* | (2006.01) | |

(52) U.S. Cl.
USPC .......... 62/373; 62/62; 62/64; 62/374; 62/295; 62/465; 62/515; 138/116; 138/38; 138/156; 138/170; 138/117; 138/111; 138/112; 138/113; 138/114; 138/115

(58) Field of Classification Search
USPC ............... 62/62, 64, 373, 374, 295, 465, 515; 165/165, 170, 177, 178, 181, 183, 906; 138/116, 38, 156, 170, 171, 111–115, 138/117
See application file for complete search history.

(56) References Cited

U.S. PATENT DOCUMENTS 1,943,855 A * 1/1934 Carter ........................... 165/115
2,638,754 A * 5/1953 Kleist .............................. 62/430
(Continued)

FOREIGN PATENT DOCUMENTS

| EP | 0 605 147 | 7/1994 |
|---|---|---|
| EP | 0 919 279 | 6/1999 |
| FR | 2 686 964 | 8/1993 |

OTHER PUBLICATIONS

International Search Report for PCT/EP2008/055460.

*Primary Examiner* — Frantz Jules
*Assistant Examiner* — Erik Mendoza-Wilkenfe
(74) *Attorney, Agent, or Firm* — Christopher J. Cronin; Sylvie Mellul-Bendelac

(57) ABSTRACT

The device according to the invention for the cooling of articles, comprising at least one channel which can be connected to a first coolant source such that a first stream of a first coolant can flow through the channel, the articles to be cooled being introducible into the stream, is distinguished in that at least one cross-sectional stabilizer for stabilizing the cross section of the at least one channel is formed. The device according to the invention advantageously allows the defined cooling of articles, in particular the freezing of drops of a liquid or pasty material, in particular of liquid or pasty foods. In particular, a deformation, such as warping, of the channels on account of pronounced temperature gradients and/or temperature transients is effectively reduced. Thus, even after cooling-down operations, uniform cooling conditions can be ensured.

3 Claims, 2 Drawing Sheets

(56) References Cited

U.S. PATENT DOCUMENTS

| | | | |
|---|---|---|---|
| 2,764,488 A * | 9/1956 | Slattery | 426/384 |
| 3,174,540 A * | 3/1965 | Dutton | 165/104.14 |
| 3,300,993 A | 1/1967 | Schlemmer | |
| 3,447,337 A * | 6/1969 | Nelson et al. | 62/318 |
| 4,117,831 A * | 10/1978 | Bansal et al. | 126/664 |
| 4,243,020 A * | 1/1981 | Mier | 126/670 |
| 4,296,072 A | 10/1981 | Takacs et al. | |
| 4,480,634 A * | 11/1984 | Kellner | 126/656 |
| 4,843,840 A * | 7/1989 | Gibson | 62/375 |
| 5,299,426 A | 4/1994 | Lermuzeaux | |
| 5,644,888 A * | 7/1997 | Johnson | 52/651.01 |
| 5,826,646 A * | 10/1998 | Bae et al. | 165/110 |
| 5,881,561 A | 3/1999 | Viard | |

\* cited by examiner

DEVICE FOR THE COOLING OF ARTICLES AND ITS USE

CROSS-REFERENCE TO RELATED APPLICATIONS

This application is a §371 of International PCT Application PCT/EP2008/055460, filed May 5, 2008.

BACKGROUND

The subject of the present invention is a device for the cooling of articles and its use. The preferred field of use of a device according to the invention is the freezing of articles in the food industry, in particular the freezing of drops of a pasty and/or liquid mass.

Hitherto, in particular, foods have been frozen by introducing the articles to be frozen into a stream of a coolant, for example into liquid nitrogen. As a result of contact with the liquid nitrogen, for example in a channel, a cooling and freezing of the corresponding articles take place when the dwell time in the liquid nitrogen is sufficiently long. These appliances cannot be operated continuously, on the contrary they have relatively long times in which they are not operated, for example due to cleaning work which becomes necessary between batch changes. When these appliances are started up, a precooling regularly takes place in this case, which leads to a deformation, in particular a flexion, of the channels used for the throughflow of the coolant. This leads to impermanently defined throughflow properties of the coolant through the channel and consequently to unequal cooling or freezing conditions.

SUMMARY OF THE INVENTION

Proceeding from this, the object on which the present invention is based is to propose a device for the cooling of articles, by means of which the problems known from the prior art can be at least reduced and, in particular, overcome, and, in particular, uniform throughflow conditions of the coolant or coolants can be ensured independently of the position of the channel.

These objects are achieved by means of a device having the features of claim 1. Advantageous developments are the subject-matter of the dependent claims.

The device according to the invention for the cooling of articles comprises at least one channel which can be connected to a first coolant source such that a first stream of a first coolant can flow through the channel, the articles to be cooled being introducible into the stream. According to the invention, at least one cross-sectional stabilizer for stabilizing the cross section of the at least one channel is formed.

The cross-sectional stabilizer serves for keeping the cross section of the channel essentially constant and preventing a flexion of the channel. Due to the at least one cross-sectional stabilizer, a stiffening of the channel is achieved, these stabilizers at the same time being designed such that free access to the channel for cleaning purposes becomes possible. Owing to the at least one cross-sectional stabilizer, a flexion of the channel, particularly during cooling and/or during operation with liquid nitrogen, is reduced. This means that the at least one channel flexes by at most less than 1.5 mm/m (millimeters per meter of channel length), preferably by less than 1 mm/m. In devices known from the prior art, such considerable flexions can occur that it is no longer possible to operate the device, that is to say the coolant can no longer flow through the channel. In particular, in systems known from the prior art, the channel becomes flatter in the upper region and steeper in the lower region. This is advantageously prevented in devices according to the invention by the cross-sectional stabilizers.

For this purpose, the cross-sectional stabilizer preferably makes it possible to have an essentially punctiform fixing of at least part of the at least one channel and/or of the channels to another component. Essentially punctiform fixing is understood here to mean fixing over a three-dimensional extent which is markedly smaller than the length of the channel. This is preferably understood to mean fixing in a range of 1% or less of the length of the channel.

According to an advantageous refinement of the device, at least one channel has at least one cooling conduit through which a second stream of a coolant can flow.

A refinement is in this case preferred in which a cooling conduit is assigned to a plurality of channels. A refinement is basically preferred in which at least two channels are formed. The second stream of the coolant serves first for the further cooling of the channel, and, furthermore, this stream may advantageously be used also for cooling the channel before operation commences. In particular, a refinement is preferred in which the channel is formed by the top side of a sinusoidally and/or wavily corrugated metal sheet, while the underside, together with a kind of trough beneath it, forms a single cooling conduit. Such a refinement has the advantage that distortion of the channel is reduced on account of a constant temperature due to the thickness of the sheet-metal layer forming the channels.

According to a further advantageous refinement of the device, the channel has a top side, through which the first stream can flow, and an underside, which projects into the at least one cooling conduit.

This makes it possible in a simple way to have a refinement in which the channel can experience, in addition to cooling by the first stream of a first coolant flowing through it, further cooling by a second stream of a coolant, preferably a coolant other than the first coolant.

According to a further advantageous refinement of the device, at least one cross-sectional stabilizer is formed which fixes at least part of the top side of a channel three-dimensionally.

The fixing of the top side may preferably take place to another component or else to another region of the same component, such as, for example, to a frame and/or to a part-region of the metal sheet forming the channel, which frame and/or which part-region are/is not corrugated or basically not used for forming the channel. The advantage of the three-dimensional fixing to the top side is that a refinement can be found in which neither the flow properties in the channels nor the cooling conduit are appreciably impaired. This means that, in particular, the flow in the cooling conduit is not influenced, since the latter is normally operated at low pressures, such as, in particular, at 0.2 bar or less. It is precisely here where fittings in the cooling conduit may lead to unwanted turbulences which may impair the cooling action by the second stream of the coolant. Preferably, the fixing of at least one, preferably of a plurality of, in particular of all the upper margins of the at least one channel is carried out. In the case of a plurality of channels formed parallel to one another, the fixing of the upper margins of the channels to one another is preferred, since a fixing can thus be achieved in a simple way in which the flow properties in the channels are equalized and therefore a more uniform cooling is achieved.

According to a further advantageous refinement of the device, fixing takes place at a connection region between the at least one channel and a base component.

A base component is to be understood, in particular, as meaning a component which together with the underside of the channel forms the cooling conduit. A materially integral connection between the base component and the component forming the at least one channel can be achieved in the connection region.

According to a further advantageous refinement of the device, at least one cross-sectional stabilizer is formed, which fixes at least part of the underside of a channel three-dimensionally.

A refinement is in this case preferred in which at least one cross-sectional stabilizer is formed which fixes at least one punctiform region of the underside of the channel to the cooling conduit.

Thus, advantageously, the cooling conduit may be utilized for stabilizing the channels, without outwardly projecting components having to be taken into account. What is achieved thereby is, in particular, that there is an advantageous possibility for cleaning the at least one channel which, by virtue of the downwardly continuous fixing, remains accessible in full for cleaning. In particular, simple mechanical cleaning, for example by means of brushes or the like, is thus possible.

The device according to the invention is preferably used for freezing at least one of the following commodities:
a) foods;
b) liquid substances;
c) pasty substances;
d) waxes;
e) biological materials;
f) blood;
g) medicines; and
h) pharmaceutical active substances Biological materials are understood to mean, in particular, blood plasma and blood serum. Medicines and pharmaceutical active substances are understood, in particular, also to mean medicines and pharmaceutical active substances in a carrier substance, for example a polymeric carrier substance. Waxes are understood, in particular, to mean lipids, preferably simple esters of saturated fatty acids with long-chain aliphatic alcohols, which, in particular, have a chain length of 25 to 32 carbon atoms per molecule part.

For a further understanding of the nature and objects for the present invention, reference should be made to the detailed description, taken in conjunction with the accompanying drawing, in which like elements are given the same or analogous reference numbers.

BRIEF DESCRIPTION OF THE FIGURES

The invention is explained in more detail below with reference to the accompanying drawing, without the invention being restricted to the details and advantages shown there. In the diagrammatic drawing.

DETAILED DESCRIPTION OF THE INVENTION

Figure 1:
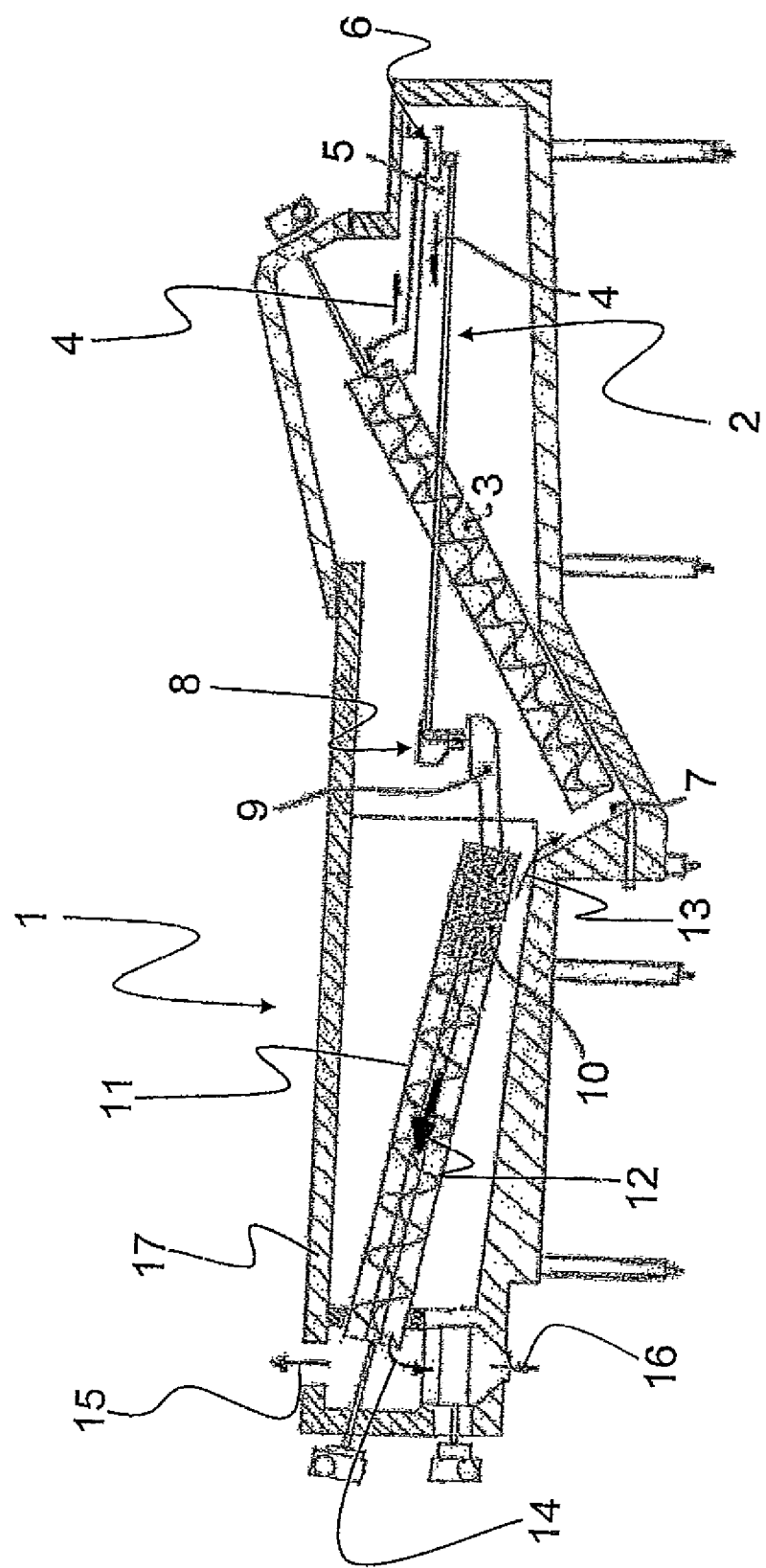
FIG. 1 shows an exemplary embodiment of a device according to the invention in longitudinal section.

FIG. 1 shows a device 1 according to the invention for the cooling of articles 5 in longitudinal section. According to the invention, the device 1 comprises at least one channel 2 which can be connected to a first coolant source 3 such that a first stream 4 of a first coolant can flow through the channel 2. In the present exemplary embodiment, the articles 5 to be cooled are drops of a pasty or liquid mass to be frozen, which are introduced into the first stream 4 by means of a drop former 6, so that the channel 2 has flowing through it a first stream 4 of a first coolant, into which the articles 5 to be cooled are introduced and with which these float along. Owing to thermal contact between the articles 5 and the coolant in the first stream 4, the articles 5 cool down. The degree of temperature of the articles 5 reached after they flow through the channel 2 is in this case dependent on the dwell time in the channel 2 and on the temperature of the first coolant. In this case, preferably, liquid nitrogen is used. The channel 2 itself is described in detail below in FIGS. 2 and 3 by means of exemplary embodiments.

The first coolant source 3 comprises an Archimedean screw, by means of which liquid nitrogen can be conveyed out of a nitrogen sump 7. Articles 5 in the first stream 4 move with the latter through the channel 2. After reaching the channel end 8, the first stream 4, together with articles 5, is fed onto the separation delivery 9 which leads the mixture of the first stream 4 and of the articles 5 to the product separator 10. The product separator 10 is part of a second Archimedian screw 11. A mixture 12 which consists of articles 5 and of cold gas and which has occurred due to the evaporation of the liquid nitrogen is led through this second Archimedian screw 11. The product separator 10 in this case is an externally perforated region of the second Archimedian screw 11, through which, by virtue of the acting centrifugal force and by virtue of the acting gravitational force, the liquid nitrogen flows as the first coolant out of the second Archimedian screw 11 and as a liquid-nitrogen stream 13 into the nitrogen sump 7. At the end of the second Archimedian screw 11, a discharge of a product stream 14, which contains the articles 5 cooled according to the invention, in particular frozen drops of a pasty or liquid mass, and a discharge of a cold-gas stream 15 take place. The product stream 14 is extracted through the product outlet 16. The entire device 1 is formed in an essentially gas-tight housing 17 which prevents the escape of evaporated liquid nitrogen and which allows thermal insulation in order to reduce the coolant consumption.

Figure 2:
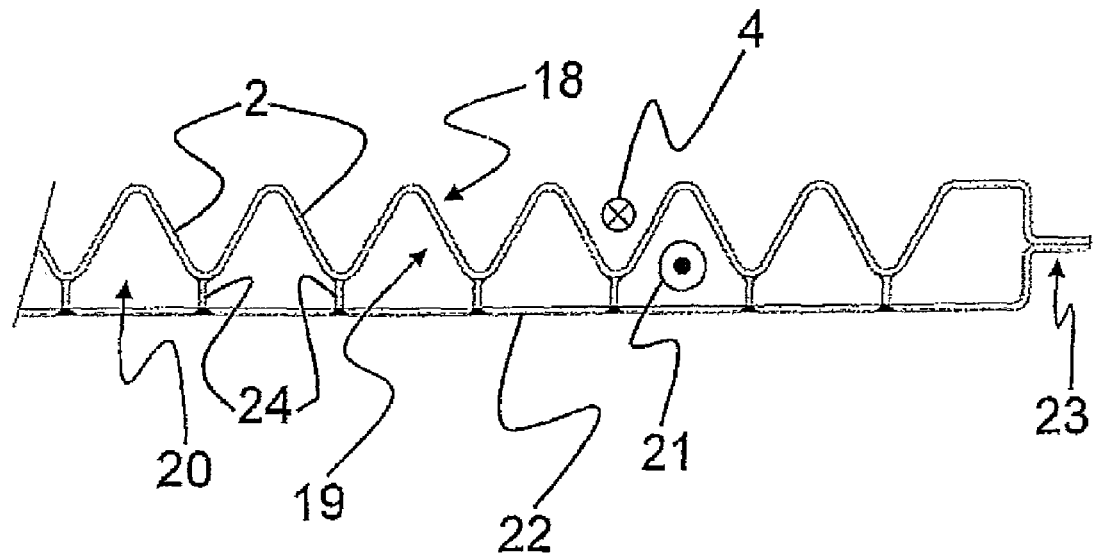
FIG. 2 shows a first example of a channel with cross-sectional stabilizers in cross section.

FIG. 2 shows a first exemplary embodiment comprising a plurality of channels 2. The channels 2 have a top side 18 and an underside 19. The first stream 4 of the first coolant can flow on the top side 18. On the underside 19 of the channels 2, a cooling conduit 20 is formed, through which a second stream 21 of a coolant can flow. In the present exemplary embodiment, the cooling conduit 20 is assigned jointly to all the channels 2. The channels 2 are formed here by an essentially wavily deformed metal sheet consisting, in particular, of high-grade steel, preferably of high-grade steel of group 316 according to AISI (American Iron and Steel Institute). The cooling conduit 20 is in this case formed by the underside 19 of the channels 2 and a base component 22. The base component 22 is preferably connected materially integrally to the metal sheet from which the channels 2 are produced. Preferably, this materially integral connection takes place in a connection region 23. A materially integral connection is understood to mean, in particular, a welded and/or soldered joint. The connection regions 23 are preferably designed such that they are made leak-tight, particularly in terms of both liquid coolant and evaporated coolant, in particular both in terms of possibly escaping liquid nitrogen and in terms of gaseous nitrogen.

According to the invention, cross-sectional stabilizers 24 are formed, which, comprising bar-shaped connecting elements in the first exemplary embodiment, are fixed to at least part of the underside 19 of the channels 2 on the cooling conduit 20 and, in particular, on the base component 22. In the present exemplary embodiment, it is shown in FIG. 2 that these cross-sectional stabilizers 24 fix any minimum of each channel 2, although it is expressly pointed out that, advantageously, only a tie-up of part of the minima of channels 2 to the base component 22 is also advantageously possible. The number and/or arrangement of the cross-sectional stabilizers 24 may particularly advantageously be varied as a function of at least one of the following parameters: a) length of the channel 2; b) width of the channel 2; c) thickness of the material from which the channel 2 has been produced; d) cooling capacity of the cooling conduit 20; e) cooling capacity of the channel 2 (in each case with respect to a maximum stream of the coolant) and f) type of coolant to be used.

The cross-sectional stabilizers 24 stabilize the cross section of the at least one channel 2 under any customary operating conditions, in particular also during the operation of the cooling of the channels 2. Furthermore, the cross-sectional stabilizers 24 prevent a flexion of the channel 2, particularly in the longitudinal direction of the latter. As a result, advantageously, a flexion, which is known in frosters known from the prior art and which leads to a distortion of the channels 2 and consequently to a changed pressure and changed flow properties of the coolant stream in the conduit, can be prevented. Thus, uniform cooling conditions in all the channels 2 can be achieved, so that the articles 5 have in each case experienced the same cooling conditions, irrespective of which of the channels 2 they have been led through. This affords a uniform cooling result of the articles 5 to be cooled.

Figure 3:
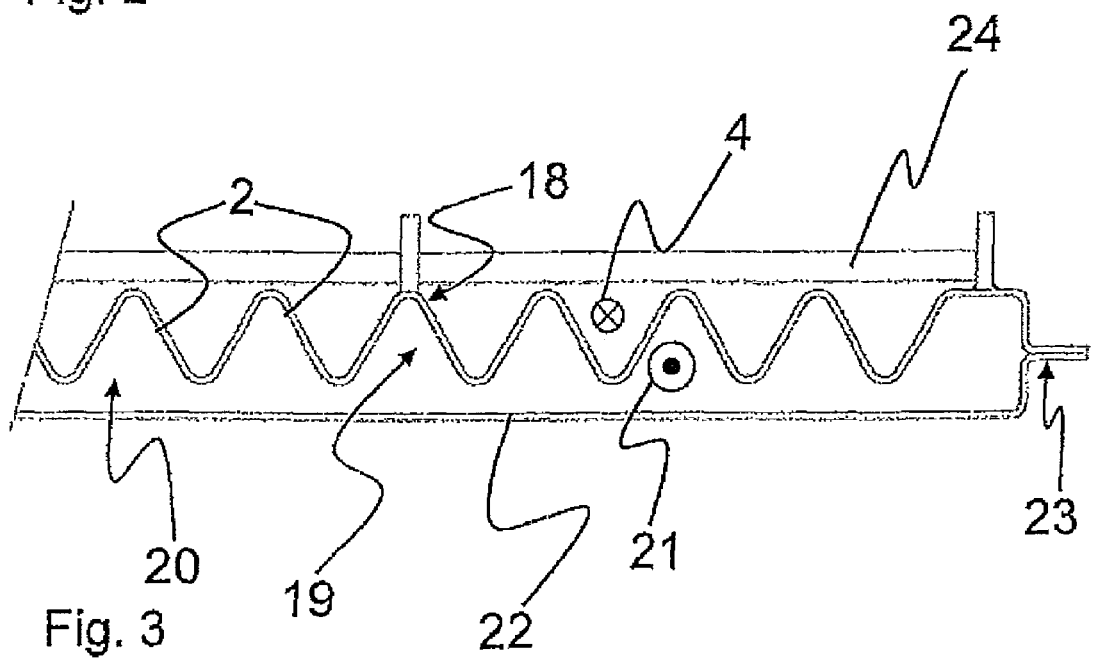
FIG. 3 shows a second example of a channel with cross-sectional stabilizers in cross section.

FIG. 3 shows a further exemplary embodiment, in which the cross-sectional stabilizers 24 fix three-dimensionally at least part of the top side 18 of the channels 2. It may be gathered, furthermore, from FIG. 3 that, here, not every crown of the channels 2 is connected to the cross-sectional stabilizer 24, but, instead, only individual crowns. The number of crowns designed with cross-sectional stabilizers 24 can be adapted as a function of the material thickness of the channels 2, the choice of material of the channels 2, the number of channels 2, the temperatures to be reached, the throughflow conditions of the coolant stream 4, etc. The embodiment according to FIG. 3 has the advantage that the cooling conduit 20 is not impaired by the cross-sectional stabilizers 24, so that, in particular, no locations can occur which lead to turbulences in the second stream 21 of the coolant in the cooling conduit 20. This allows a defined cooling of the channels 2 by the second stream of a coolant in the cooling conduit 20.

The device according to the invention advantageously allows the defined cooling of articles 5, in particular the freezing of drops of a liquid or pasty material, in particular of liquid or pasty foods. In particular, a deformation, such as a warping, of the channels 2 on account of pronounced temperature gradients and/or temperature transients is effectively reduced. Thus, even after cooling-down operations, uniform cooling conditions can be ensured.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

LIST OF REFERENCE SYMBOLS

1 Device for the cooling of articles
2 Channel
3 First coolant source
4 First stream
5 Article
6 Drop former
7 Nitrogen sump
8 Channel end
9 Separation delivery
10 Product separator
11 Second Archimedian screw
12 Mixture
13 Liquid-nitrogen stream
14 Product stream
15 Cold-gas stream
16 Product outlet
17 Housing
18 Top side
19 Underside
20 Cooling conduit
21 Second stream
22 Base component
23 Connection region
24 Cross-sectional stabilizer

What is claimed is:

1. A device for the freezing of a pasty or liquid mass of food, comprising:
 a dropper receiving the pasty or liquid mass and forming falling drops of the pasty or liquid mass;
 a corrugated metal sheet each of the corrugations of which extend in a longitudinal direction, the corrugation having a plurality of minima and a plurality of crowns, an upper side of the corrugated metal sheet receiving liquid nitrogen from a liquid nitrogen source that flows in the longitudinal direction along the upper side of the corrugated metal sheet in flow channels formed by one of the minima surrounded by maxima on each side, the dropper being disposed above the corrugated metal sheet to allow the drops to fall into the liquid nitrogen flow on the upper side of the corrugated metal sheet;
 a planar base component also extending in a longitudinal direction that is soldered or welded at transverse side ends to the corrugated metal sheet to form at least one liquid and gaseous nitrogen leak-tight cooling conduit receiving the liquid nitrogen from the liquid nitrogen source; and
 means for preventing flexion of the corrugated metal sheet in the longitudinal direction comprising a plurality of bar-shaped cross-sectional stabilizers each one of which is fixed to the base component and also fixed to a respective one of the minima of the corrugated metal sheet in a punctiform manner.

2. The device of claim 1, further comprising a product separator adapted and configured to separate frozen drops of the pasty or liquid mass from the liquid nitrogen.

3. The device of claim 1, wherein the articles are selected from the group consisting of:
 a) foods;
 b) liquid substances;
 c) pasty substances;
 d) waxes;
 e) biological materials;
 f) blood;
 g) medicines;
 h) pharmaceutical active substances; and
 i) combinations thereof.

* * * * *